United States Patent [19]

Kyrazis

[11] Patent Number: 4,589,070

[45] Date of Patent: May 13, 1986

[54] AIRBORNE WIND SHEAR RESPONSE SYSTEM

[75] Inventor: Demos T. Kyrazis, Albuquerque, N. Mex.

[73] Assignee: R & D Associates, Marina del Ray, Calif.

[21] Appl. No.: 436,633

[22] Filed: Oct. 25, 1982

[51] Int. Cl.$^4$ .................. G01P 3/36; B64C 13/10
[52] U.S. Cl. ........................... 364;424; 340/968; 356/28.5; 364/427; 364/428; 244/181; 244/182; 73/178 T
[58] Field of Search ............... 356/28, 28.5, 343, 351; 364/434, 424, 421, 427, 428; 340/968; 250/339; 343/5 FT, 5 HE, 5 W, 8; 244/181, 182; 73/178 T

[56] References Cited

U.S. PATENT DOCUMENTS

| | | | |
|---|---|---|---|
| 3,780,293 | 12/1973 | Flint | 250/339 |
| 3,784,685 | 10/1976 | Fletcher et al. | 356/28.5 |
| 3,856,402 | 12/1974 | Low et al. | 356/28.5 |
| 3,915,572 | 10/1975 | Orloff | 356/343 |
| 3,984,686 | 10/1976 | Fletcher et al. | 356/28.5 |
| 4,079,905 | 3/1978 | Greene | 340/968 |
| 4,156,875 | 5/1979 | Keane et al. | 343/5 FT |
| 4,167,329 | 9/1979 | Jelalian et al. | 356/28.5 |
| 4,390,950 | 6/1983 | Muller | 364/434 |

OTHER PUBLICATIONS

Vintslav et al, Lidar Measurements of the Wind by Spatial Filtering, Apr. 1978, pp. 442–446, Sov. J. Quantum Electronics, 8 (4).

Bartlett et al, Remote Measurement of Wind Speed Using a Dual Beam Backscatter Laser Doppler Velocimeter, Aug. 1976, vol. 15, No. 8, Applied Optics.

Klass, "Doppler Radar Tests Demonstrate Wind-Shear Warning Technique", 8-19-85, pp. 31–32, Aviation Week.

"FAA Plans to Buy Wind-Shear Alert Devices", 10-1-7-83, Washington Post, The Federal Triangle.

Primary Examiner—Errol A. Krass
Assistant Examiner—Thomas G. Black
Attorney, Agent, or Firm—Poms, Smith, Lande & Rose

[57] ABSTRACT

An aircraft is provided with wind velocity measuring equipment which measures the wind velocity both (1) close to the aircraft and (2) at a considerable distance such as one-half mile or a mile away from the aircraft; and a large difference in these two measured velocities indicates dangerous windshear conditions. Either a warning signal is given to the pilot, or automatic control apparatus is actuated, to avoid crash conditions. A single pulsed carbon dioxide ($CO_2$) laser velocimeter may be mounted in the aircraft for measuring both the close-in and the distant wind speeds. The laser optic focus is shifted between the near and far measurements, and the return signal is time gated to increase signal-to-noise ratio.

9 Claims, 5 Drawing Figures

AIRBORNE WIND SHEAR RESPONSE SYSTEM

FIELD OF THE INVENTION

This invention relates to aircraft wind velocity measurement systems, and to aircraft warning and automatic control systems.

BACKGROUND OF THE INVENTION

A number of aircraft accidents occur each year as a result of "wind shear". The nature of windshear has become better known in the last year or two, and a particularly dangerous form of wind shear involves a meterological phenomenon known as a "downburst" or a "microburst". These are particularly insidious and dangerous forms of wind shear, as they are highly localized, often 2 to 3 kilometers in diameter; they are short-lived, in the order of two to six minutes in duration; and often occur in what has appeared visually to be benign meterological conditions.

A "downburst" or "microburst" is a localized, intense downdraft with vertical currents exceeding a downward speed of 12 feet per second (720 feet per minute) at about 300 feet above the surface of the ground. As the "downburst" or "microburst" strikes the ground, a gust front is created by the horizontal outflow, and this can be visualized by analogy to pouring a thick liquid onto a table top. The outward flow pattern can have velocities in the order of 40 to 70 knots (in the order of 46 to 80.5 miles per hour). Also, in traversing the microburst near the ground, the velocity shifts from plus 40 to 70 knots (a headwind) to minus 40 to 70 knots, (a tailwind) with a resultant shift in wind velocity relative to the ground of 80 to 140 knots.

Incidentally, the precise meteorological factors going into the formation and development of microbursts or downbursts are not known with assurance; however, it appears possible that it may involve special preconditions where warm moisture in the air turns into water vapor and expands and rises rapidly in a cumulative build-up of upsurging air; and the "downbursts" or "microbursts" may be an aftermath or counter-flow of down surging air. However, for the purposes of the present invention the exact nature of the origins of the phenomenon are not really important. Additional background information on "microbursts" or "downbursts" is set forth in an article entitled "What You Don't Know About Wind Shear Can Kill You", by William Melvin, which appeared in the August 1982 Delta Air Lines Publication, "The Roar" published by Delta Air Lines Local Council, No. 44 Atlanta, Ga., page 2 et seq.

Figure 1:
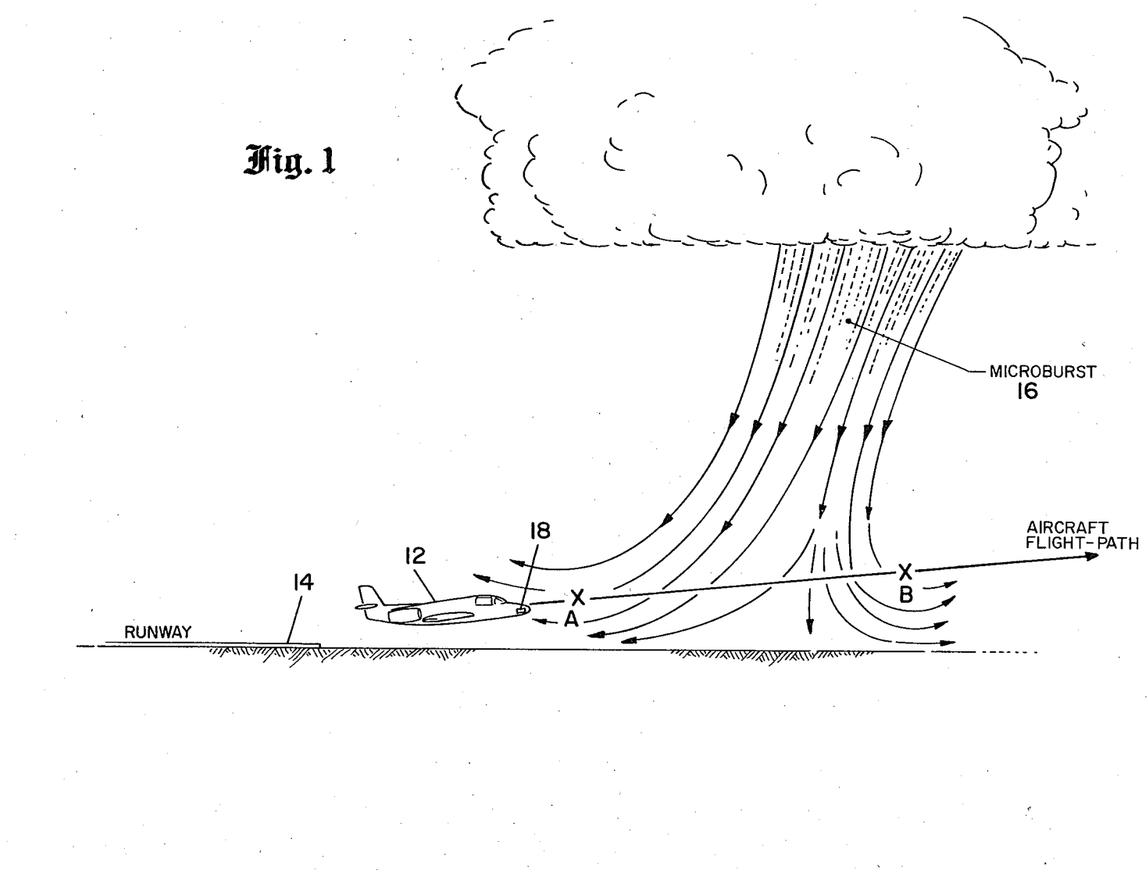
FIG. 1 shows a typical dangerous encounter of an aircraft, taking off, with a "microburst" or a "downburst" form of wind shear.

One particularly dangerous form of encounter with wind shear is shown in FIG. 1 of the drawings to be described in greater detail below. The aircraft has just taken off and is starting to climb, as it enters the "microburst" or "downburst". At this point the aircraft is flying in a strong head wind, perhaps 40 to 70 knots. Then it passes through the center of the microburst and suddenly is in a strong tail wind. Since the inertia of the aircraft maintains its speed *constant with respect to the earth,* the sudden change in wind direction results in a loss of airspeed possibly below stall conditions, with possible serious consequences.

More specifically, this type of wind shear characteristically occurs at low altitudes; and when an aircraft encounters these "microbursts" or "downbursts" it is normally either taking off and climbing or is in an approach for landing. For a Boeing 727 aircraft in these situations, for example, the air speed is approximately 140 knots and the stall speed is about 105 to 110 knots. Thus, a 40 knot change in air speed due to shear will put the airplane into a stall. When this occurs unexpectedly, there may be insufficient altitude to recover.

Ground based equipment to measure and warn of wind shear in the vicinity of airports have been tried with varying degrees of success (see reference 2). These devices range from mechanical anemometers placed at various locations on the airport, to sophisticated doppler weather radars (see reference 4) and more recently laser radars (LIDAR) (see reference 5). The simpler systems are inadequate because they can miss the presence of wind shear completely if it occurs outside of the immediate vicinity of the airport. The doppler radars and LIDARS can cover a reasonable area surrounding the airport; however, these systems have the disadvantage of being expensive, and destined for installation in a relatively few major airports. Hence, a large number of airports served by the airlines may never have a wind shear detection system. Secondly, the delay time in getting the information from the controller to the pilot may be too long for corrective action to be taken. Finally, a given wind shear field affects different types of aircraft differently. Therefore, the pilots' corrective actions depend on the character of the shear and type of aircraft. This latter type of information would be difficult to pass from controller to pilot.

Various airborne systems have been installed and tested. Examples of such systems are instruments that compare, ground speed to airspeed, devices that give warning based on comparison between angle of attack and pitch attitude, and laser devices. These schemes, as applied, do give warning of wind shear. However, because of the principles upon which they are based or because of implementation, the warning time is too short (0–3 seconds) and the pilot recognizes he's in wind shear at about the same time he gets a warning.

Accordingly, a principal object of the present invention is to provide a wind shear detection and prediction system which will allow adequate time for appropriate action to be taken to avoid the types of aircraft disasters which have all too often occurred when aircraft encounter wind shear phenomena, particularly of the microburst or downburst type.

SUMMARY OF THE INVENTION

In accordance with an important aspect of the invention, wind velocity measurements are taken both near the aircraft, and at a point some distance away from the aircraft, perhaps one kilometer, (or from one-quarter mile to a mile from the aircraft), and the difference in wind velocity is measured, so that drastic differences in wind velocity along the flight path may be recognized and appropriate warnings given and corrective action taken.

In accordance with a more specific preferred aspect of the invention, a laser velocimeter may be mounted on an aircraft and may be alternately focused and/or gated to measure the velocity close to the aircraft and remote from the aircraft.

In accordance with additional features of the invention: (1) the laser may be a carbon dioxide laser, operating in the far infrared, to provide many desirable practical adventages, as noted below; (2) a pulsed laser beam and a gated detector for sensing the return is particularly useful for the distant velocity measurement; (3) the aperture for the laser velocimeter may be in the order of 20 centimeters, or between about 3 and 10 inches as a compromise between the desire for a large aperture for good signal-to-noise ratio, and a small aperture for low weight, volume and cost; (4) a non-linear device may be provided to detect the combined doppler shifted return or reflected laser light and a reference signal from the original laser frequency, and the radio frequency beat selectively amplified and analyzed; and (5) the processing circuitry may include doppler shift detection circuitry including a filter for separating the frequencies of interest corresponding to the air speeds or velocities of interest, an analog-to-digital converter, a Fast Fourier Transform processor and suitable buffering and storage circuits, in addition to a microprocessor.

Other objects, features, and advantages of the invention will become apparent from, or will be set forth in the course of, the following detailed description, relating principally to the accompanying drawings.

DETAILED DESCRIPTION

Before describing the drawings in detail, it is useful to mention the interrelation of the various units which will be used. This is useful and desirable because aircraft pilots reference airspeed in terms of knots, and scientists often use the metric system, while many others are more familiar with miles per hour, and feet and inches. In all events, starting with "knots" a knot is one nautical mile per hour, and one nautical mile is equal to 6,076.10 feet. Accordingly, one knot is equal to about 1.15 mile per hour, and 40 knots is about equal to 46 m.p.h. Concerning the metric system, one kilometer is 1,000 meters and is equal to about ⅝ mile, or more precisely, 0.62136 miles; and one inch equals 2.54 centimeters. The velocity of light comes into some of the relationships noted below, and it is $3 \times 10^{10}$ centimeters per second, or $3 \times 10^8$ meters per second. Thus, with distance being equal to the product of velocity times time, or $D=VT$, it takes light from a laser, about 6.6 millionths of a second or 6.6 microseconds to travel one kilometer down and one kilometer back to the aircraft, in the context discussed below. Incidentally, in referring to seconds, thousandths of a second are milli-seconds, ($10^{-3}$ sec.); millionths of a second are microseconds ($10^{-6}$ sec) and billionths of a second are referred to as nanoseconds ($10^{-9}$ sec.).

Now, referring back to the drawings, FIG. 1 shows an aircraft 12 which has just taken off from a runway 14 and is heading for a "microburst" or "downburst" 16. As the aircraft 12 enters the microburst 16, it encounters strong headwinds at point "A", perhaps 40 to 70 knots, as mentioned above, and it may be at an airspeed of about 140 knots. As it passes through the center of the microburst and reaches point "B", however, the wind has reversed and there is now a 40 to 70 knot tailwind. Unfortunately, however, the inertia of the aircraft means that its velocity relative to the ground remains *constant* with the result that its airspeed is suddenly reduced by 80 to 140 knots, and in such cases the air speed may well drop below the stall airspeed of 105 or 110 knots. At low elevations and with a heavily loaded aircraft, the result has, in a number of cases, been a disaster.

As mentioned above, the present system detects this type of wind shear condition, and alerts the pilot in time to take appropriate corrective action, such as aborting a landing, applying full available power on take-off, or avoiding the area of the "microburst" or "downburst", when such action is practical. Alternatively, the system may be arranged to automatically take appropriate corrective action.

The systems of the present invention are mounted in the aircraft 12, as indicated at reference numeral 18, and measure the air speed *both* close to the aircraft, for example, at point "A" in FIG. 1 and also at point "B" in FIG. 1, perahps one kilometer ahead of the plane. The distance of point "B" from the plane is chosen to give the pilot adequate warning time, and it has been estimated that ten seconds will be adequate. At an airspeed of 160 knots, a one kilometer distance will give about ten seconds warning. Longer distances may be used, for example, prior to take-off, and shorter distances, down to a quarter mile or so would still provide useful advance warning to the pilot.

Figure 2:
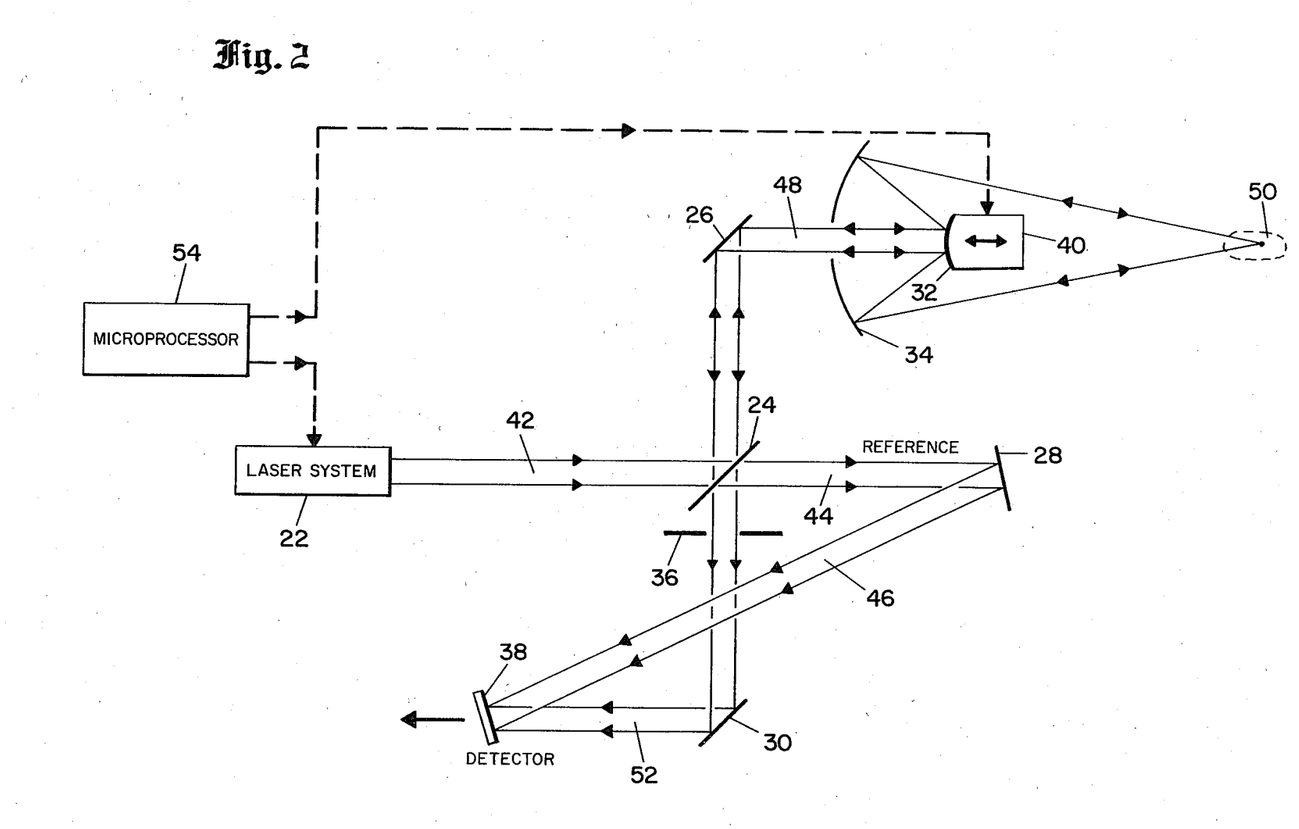
FIG. 2 is a schematic showing of the optical portion of a wind shear detector.

One preferred implementation of the system will now be described in connection with FIGS. 2 through 4 of the drawings. The optical portion of the system is shown schematically in FIG. 2. The optical system includes of a carbon dioxide laser 22 radiating at a wavelength of 10.6 micro-meters; a beam splitter, or partially silvered mirror 24; beam turning mirrors 26, 28 and 30; transmit/receive optics, including curved mirrors 32 and 34; a spatial filter 36 and a radiation detector 38. In addition, the smaller convex reflecting mirror 32 is provided with suitable piezoelectric or electrodynamic arrangements 40 for shifting its position axially so as to change the focus or focal distance of the system. The direction of propagation of the light waves is shown by arrows extending along the rays. For clarity, such conventional items as polarizers, one-quarter and one-half wave plates, etc., are not shown and would, of course, be included in the complete system. In operation, the beam 42 propagates to the beam splitter 24. Most of the energy is diverted toward the first turning mirror 26 and is called the probe beam. A small portion of the laser energy goes through the beam splitter to turning mirror 28 and on to the detector 38 along beams 44 and 46. This beam acts as a local oscillator reference to be mixed with the back-scattered radiation at the detector. The probe beam, after being turned by mirror 26 proceeds as beam 48 to the secondary mirror 32, then on to the primary mirror 34, and is focused onto the focal volume 50. The aerosols within the focal volume 50 scatter some of the radiation back toward the output mirror 34. The back-scattered radiation collected by mirror 34 is sent back through the optical system from the secondary mirror 32 to the turning mirror 26, through the mirror 24, through the spatial filter 36, onto turning mirror 30 and finally onto the detector 38. The spatial filter 36 blocks back-scattered radiation from aerosols outside of the volume 50, thereby increasing the signal-to-noise ratio at the detector.

A suitable detector 38 for the carbon dioxide laser for infrared wave lengths is thermo-electrically cooled mercury-cadmium-tellurium (Hg-Cd-Te). Since the detector 38 measures power rather than electric field strength, it acts as a square law device for mixing the electric fields from the reference beam 46 and the backscattered beam 52. This mixing of the two beams at the detector surface results in hetrodyning the doppler shifted beam down to the radio frequency range.

It is noted again that the secondary mirror 32 may be moved with respect to the primary mirror so that the focal distance can be varied. This may be accomplished either by a piezoelectric transducer, or an electrodynamic transducer such as that employed in a speaker coil, and reference numeral 40 indicates such a transducer. The movement of the secondary mirror 32 by transducer 40 is under control of the microprocessor 54 shown at the left in FIG. 2, and also in FIG. 3 of the drawings. If the zone 50 is chosen to be 10 meters ahead of the aircraft, then the diffraction limited diameter of the focal volume is 1.29 millimeters. However, when the focal distance is changed to one kilometer, the focused zone is 12.9 centimeters in diameter, which is nearly the size of the primary mirror 34. Accordingly, the rays are very nearly parallel when the optical system is focused at one kilometer. Given the scale size of meteorological phenomena a focal volume 50 that extends for 30 meters along the beam axis is considered appropriate. Restricting the measurement to this small a volume is accomplished by pulsing the laser on for a period of 200 nanoseconds, or 200 billionths of a second, as indicated in FIG. 4 of the drawings, and by appropriate gating of the return as noted below.

Figure 3:
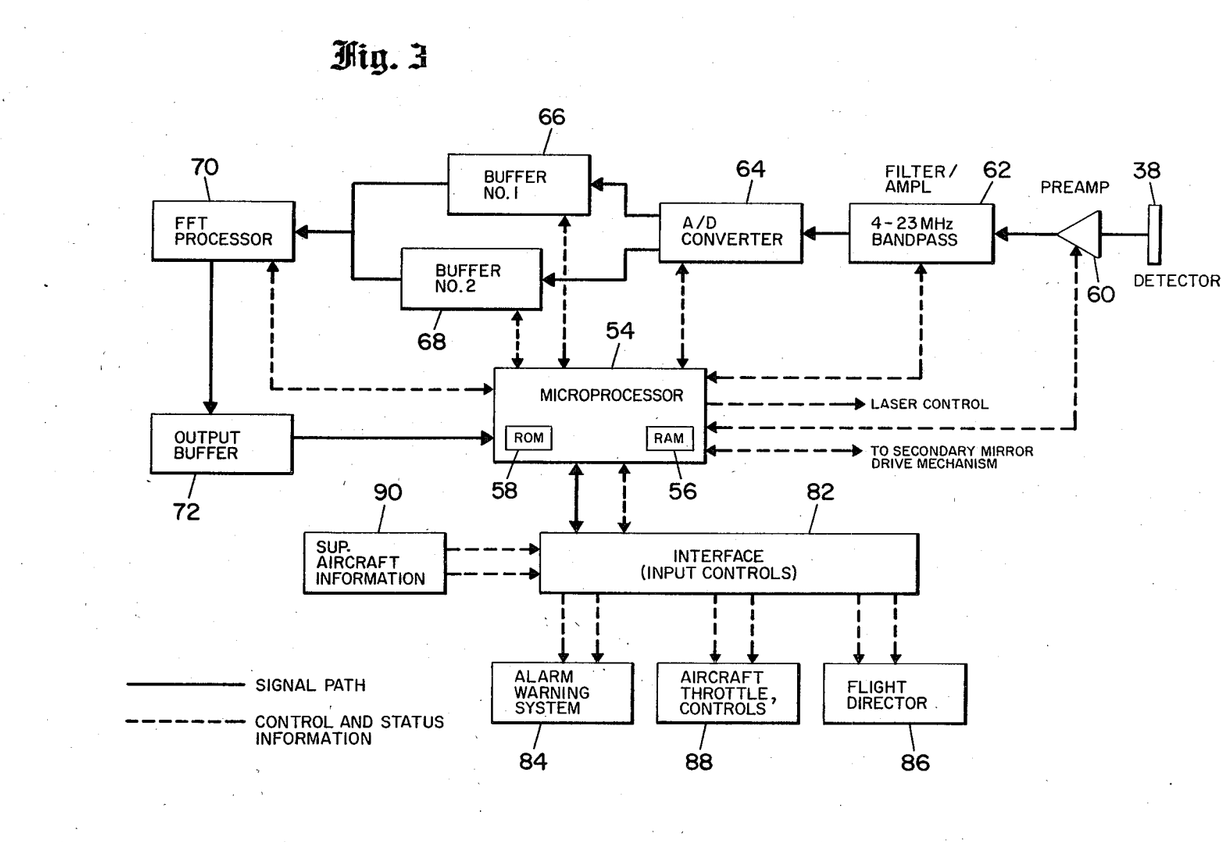
FIG. 3 is a block circuit diagram of the signal processing portion of a wind shear detector.

FIG. 3 shows a block diagram of the signal processing portion of the system. The microprocessor or microprocessors 54 are used both for the control of the various functions and to perform the computations required for warning or control purposes. Associated with the microprocessor 54 is suitable random access memory, or RAM 56 and read-only memory or ROM 58. The random access memory 56 stores information being processed, and the ROM may include aircraft dynamics information and the stored program for controlling the steps set forth hereinabove.

Before describing the various signal processing and computational functions, it is appropriate to first examine the requirements imposed by the magnitude of the doppler shifted frequency DF, and the frequency resolution Df, required to detect a 2.5 knot change in velocity relative to the speed of the aircraft.

It is well known from communications theory that, when sampling a signal, the sampling rate must be at least twice as fast as the highest frequency present. Thus, to digitize a 22.3 megahertz signal, we must sample at a rate no less than 44.6 megasamples per second, or 44.6 million samples per second. For convenience, 50 megasamples per second has been selected as the digitizing rate. It can be shown (9) that for a signal of duration, T, the frequency resolution one can obtain is Df equals 1/T. We will call Df an elementary resolution band. Thus, for Df of 242.8 kilohertz we need to measure the doppler return for a period of 4.12 microseconds. However, it is possible to mistake one frequency for another in an adjacent resolution band due to a phenomenon called leakage. Leakage can be greatly suppressed by performing a known mathematical operation known as "hanning" on the signal. The penalty for "hanning" is to double the time, T. Thus, to maintain the resolution on a "hanned" signal, we must measure the doppler return to T=8.24 microseconds. The signal can be analyzed, and Df determined either by passing the signal through a frequency analyzer or by performing a discreet Fourier transform on the signal. If we use the filter approach, either analog or digital, the transient response which will occur is unacceptable. On the other hand, if a discreet Fourier transform is employed, the signal is implied to be periodic and the problem of transient response is avoided. In addition, by implementing the discreet Fourier transform by using the Fast Fourier Transform (FFT) algorithm, all of the calculations may be accomplished quickly with minimum roundoff and truncation error in the computations. The Fast Fourier Transform algorithm is most easily implemented if the number of sample points is equal to $2^N$, where N is an integer. From the above considerations, it has been determined that the criteria may be met by sampling the signal at 20 nanosecond intervals and by storing at least 512 samples. Then the time T would be equal to 10.24 icroseconds. It has also been determined that the statistical variation in measurement is greatly reduced by the collection of an additional 512 points and averaging the result after transforming, and the time T is now equal to 20.48 microseconds. To guarantee obtaining a total of 1024 data points, the return from 103 pulses will be examined.

The block diagram of FIG. 3 will now be considered. It will initially be assumed that we are making the remote velocity measurement at a distance of one kilometer from the aircraft. The intensity history of the laser pulse is shown in FIG. 4, to the left. High intensity 200 nanosecond pulses are sent out from the laser. The microprocessor gates the preamplifier 60 to the "on" state at 6.67 microseconds after the initiation of the pulse. This corresponds to the round trip time of a light beam to one kilometer. The preamplifier 60 is then turned off at 6.87 microseconds, thereby receiving a return signal only from the region of interest, a cylindrical volume about 30 meters long, at a distance of about one kilometer. Incidentally, at the low altitudes which are involved, aerosols in the air will provide adequate back scatter. The laser is kept running between pulses at a very low intensity for up to 70 microseconds, which is about 350, times longer than the 200 nanosecond pulse. This provides the reference beam for heterodyning and provides a suitable low duty cycle for the laser. Also, the time period of 70 microseconds allows for looking at ranges as far away as 10 kilometers. This is particularly desirable as an initial step when the aircraft is still on the ground, before take-off. The gated signal from the preamplifier 60 is applied to the band pass filter 62 and is amplified to match the input requirements of the analog-to-digital converter 64. The analog-to-digital converter 64 samples at 50 megasamples per second, with at least a 6 bit quanization accuracy. Of course, the designation "bit" refers to binary digits, and the output from the analog-to-digital converter 64 is in terms of binary digits forming binary numbers for ease in handling by the microprocessor 54 and other digital circuitry. One suitable analog-to digital converter which is commercially available is the TRW Corporation Part No. PDC1029J (10). The output from the analog-to-digital converter is stored in buffer No. 1, designated by reference numeral 66 until 512 sample points are collected. The output from buffer No. 1 is fed into the fast Fourier transform processor 70 while the second buffer 68 is being filled. One commercially available fast Fourier transform processor that can perform 1024 transforms in 3.6 milliseconds is the Analogic Corporation AP490 Processor. Commercially available FFT units include arrangements for optionally including the hanning function mentioned above. The results of the FFT calculation from circuit 70 may then be applied to output buffer 72 for use by the microprocessor 54. A complete measurement may be made in a total of 7.21 microseconds. In this time period the aircraft will have moved 23.4 inches.

Figure 4:
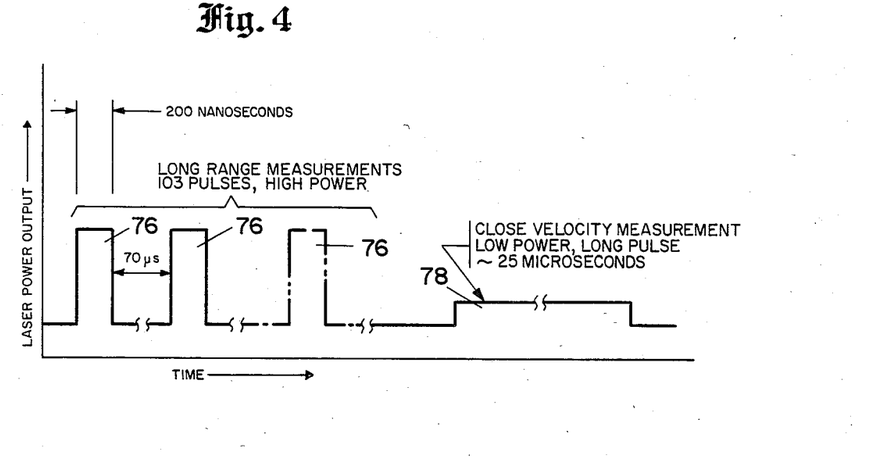
FIG. 4 is a qualitative indication of the laser pulse output.

With reference to FIG. 4 of the drawings, following the processing of data from 103 high power pulses 76, the long range or one kilometer velocity measurement is completed, and the secondary mirror 40 is shifted in its position to focus on a distance close to the aircraft, and a long relatively low power pulse 78 is transmitted from the laser. The low power pulse may be left on for 25 microseconds, by way of example. This would permit obtaining all the data from a single pulse, and the only delay to the next measurement would be the FFT processing time.

Now, referring back to FIG. 3, additional blocks shown in this figure include the interface circuit 82, the alarm warning system 84, the flight director system 86, a block 88 designated "aircraft throttle, controls" and block 90 designated "supplemental aircraft information". In the simplest version of the present system, an audible wind shear warning system 84 is provided, and upon the detection of wind shear conditions upon landing or take-off, an audible alert may be provided. In the case of landing, the audible alert could be "Wind Shear Alert—Pull Up—Do Not Land". On the hand, in the case of takeoff, if wind shear is detected before the "point of no return" in the takeoff procedures, the plane should not take off, and an appropriate audible signal given to the pilot. On the other hand, if the aircraft is airborne during takeoff, the warning should be phrased in terms such as the following: "Wind Shear Alert—Full Throttle—Prepare For Reduction in Air Speed". Supplemental aircraft information such as switches indicating the state of the flaps and the altitude of the aircraft above ground, by way of example, may be provided by circuitry 90 to the interface circuit 82, and the microprocessor. This supplemental information is employed in determining the type of warning or automatic corrective action to be taken, as mentioned hereinabove.

Figure 5:
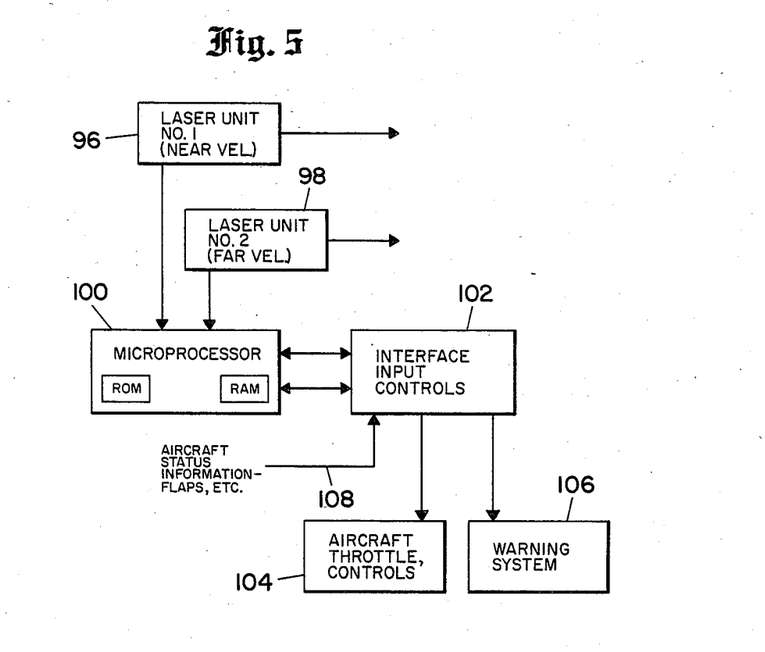
FIG. 5 is a schematic block diagram showing of an alternative system using separate near and far velocity detection systems.

FIG. 5 shows an alternative embodiment of the invention in which a first laser velocimeter 96 is provided for measuring velocities close to the aircraft, and a second laser velocimeter 98 is employed for measuring the air speed at a distance such as one kilometer from the aircraft. By this type of arrangement, more nearly standard components may be employed, and there is no need for special arrangements to change the focal length of the laser. In addition, the system of FIG. 5 has the microprocessor 100 and interface circuitry 102, as well as outputs to the aircraft throttle and other controls 104, and a suitable warning system 106, including the functions mentioned hereinabove in connection with FIG. 3 of the drawings. In addition, appropriate signals are provided on circuits as indicated by lead 108 to provide inputs as to the condition of the flaps, altitude of the plane above ground, etc. In general, with the exception of the use of two separate laser velocimeters, the system of FIG. 5 is comparable to that of FIG. 3, and the details shown in FIG. 3 are fully applicable to the system of FIG. 5.

Incidentally, the use of the carbon dioxide laser, which operates at a frequency in the far infrared spectrum, is preferred for a number of reasons including the following:

1. It is not damaging to the human eye, at the power levels and under the conditions mentioned hereinabove.
2. The frequency of the carbon dioxide laser is such that it propagates well through the atmosphere, including clouds or moisture laden air.
3. The frequencies which are involved lend themselves well to simplicity in signal processing.
4. Carbon dioxide lasers have been employed fairly widely and they are commercially available.
5. The operating cost of carbon dioxide lasers is relatively low.

Concerning other possibilities, the visible and the near infrared lasers do not meet the eye safety criteria. In the mid-infrared region, the hydrogen fluoride and the carbon monoxide lasers propagate poorly in the atmosphere. The deuterium fluoride laser propagates well, but its operating costs are high. The carbon dioxide laser operating in the far infrared meets all five criteria noted above. The signal processing aspects, which have also been discussed above, strongly favor the carbon dioxide laser.

For completeness, a number of references provide useful background in connection with the present invention. In some cases, in the course of the present specification, these references have been noted to provide more complete information. The references are listed below:

1. Melvin, W., "Wind Shear—What You Don't Know Can Kill You!!!" *The Roar From* 44—Delta Air Lines Local Council 44 Newsletter—Atlanta, Ga., August 82.
2. Camp, D. W., Frost, W., and Parsley, P., Editors, "Proceedings: Fifth Annual Workshop on Meteorological and Environmental Inputs to Aviation Systems," *NASA CP*-2192 Mar. 31–Apr. 2, 1981.
3. McKean, K., "Solving the Mystery of Wind Shear," *Discovery* September 82.
4. Doviak, R. V., Zrnic, D. S., and Sirmans, D. S., "Doppler WeatherRadar," *Proc. IEEE,* Vol 67, #11, November 79.
5. Sam, R. C., and Roullard III, F. P., "Narrow Band, Tunable Alexandrite Laser for Meteorological LIDAR," *Electro-Optical Systems Design,* July 82.
6. Drain, L. E., The Laser Doppler Technique, WileyInterscience 1980.
7. Fingerson, L. M., "Laser Doppler Velocimeters," *Laser Focus with Fiberoptic Technology,* August 82, pp 53–56.
8. Gilbert, K. G., and Otten III, L. J., Editors, *Aero-Optical Phenomena, Vol* 80 of Progress in Astronautics and Aeronautics, AIAA 1982.
9. Blackman, R. B., and Tukey, J. W., *The Measurement of Power Spectra,* Dover 1959.
10. *Electronics,* Oct. 6, 1982, (a) page 138, article on Analogto-Digital Converter Chip; (b) page 150, article on Fast Fourier Transform Array Processor.

It is also noted that Spectron Development Laboratories, 3303 Harbor Blvd., Suite G-3, Costa Mesa, Calif. 92626, offers laser velocimeters for sale.

In the foregoing detailed description and specification, certain specific embodiments of the invention have been discussed and described. However, the present invention is not limited to that precisely as shown and described hereinabove. By way of example but not of limitation, instead of using carbon dioxide lasers, other laser velocimeters may be employed, preferably having similar desirable characteristics as outlined hereinabove. It is particularly contemplated that in the course of the next few years, other lasers may be developed which have these desirable characteristics, and accordingly, the present invention is not limited to one particular type of laser. In addition, the system may be supplemented by other wind speed detection devices for detecting wind speed both close to the aircraft and at a distance from it, and with the optimum data employed for warning and control purposes. Concerning another aspect of the invention, when wind shear is encountered it is normally desirable to change the configuration of the aircraft, including the external configuration and the power settings. These changes may involve increasing or reducing the throttle settings, increasing or reducing the pitch attitude of the aircraft, and/or raising or lowering the flaps and/or landing gear, by way of specific examples. Accordingly, the present invention is not limited to that precisely as shown and described hereinabove.

What is claimed is:

1. An airborne wind shear safety system for mounting on an aircraft comprising:
   a laser;
   means for mounting said laser on an aircraft, with the laser directed substantially forwardly from the aircraft;
   means for focusing said laser alternately at a near zone close to the aircraft, and at a distant zone spaced at least one-quarter mile ahead of the aircraft;
   means for receiving the reflected return from aerosols or other particles in the air and for beating them with reference signals derived from said laser to provide a radio frequency signal representative of the doppler shift in the reflected signals at both the near zone and at the distant zone;
   means for determining the relative speed of the air with respect to the aircraft both at the near and distant zones from said radio frequency signals;
   means for determining the difference in relative speeds at the near and distant zones;
   a response circuit for initiating action to avoid aircraft stall; and
   means for energizing said response circuit when said difference exceeds a predetermined level;
   whereby wind shear is detected at least several seconds prior to a drastic change in airspeed so that appropriate corrective action may be taken.

2. An airborne wind shear safety system as defined in claim 1 wherein said system includes means for pulsing said laser with a series of short high power pulses spaced apart by at least 20 microseconds, for said distant velocity measurements, so that velocities at distances of up to at least three kilometers may be measured.

3. An airborne wind shear safety system as defined in claim 1 wherein said response circuit is a pilot warning system.

4. An airborne wind shear safety system as defined in claim 1 wherein said response circuit includes means for changing the aircraft configuration to minimize wind shear effects.

5. An airborne wind shear safety system as defined in claim 1 wherein said velocity determining means includes means for pulsing said laser, and means for gating the return from the pulse to select the desired range.

6. An airborne wind shear detection system as defined in claim 1 including aircraft throttle controls, and means for automatically actuating said throttle controls to increase aircraft power to minimize wind shear effects when said difference in wind velocity exceeds a predetermined level.

7. An airborne wind shear safety system as defined in claim 1 wherein said laser is a carbon dioxide laser.

8. An airborne wind shear safety system for mounting on an aircraft comprising:
   a laser;
   means for mounting said laser on an aircraft, with the laser directed substantially forwardly from the aircraft;
   means for focusing said laser alternately at a near zone close to the aircraft, and at a distant zone spaced at least one-quarter mile ahead of the aircraft;
   means for receiving the reflected return from aerosols or other particles in the air and for beating them with reference signals derived from said laser to provide a radio frequency signal representative of the dopplar shift in the reflected signals at both the near zone and at the distant zone;
   means for determining the relative speed of the air with respect to the aircraft both at the near and distant zones from said radio frequency signals;
   means for determining the difference in relative speeds at the near and distant zones;
   a response circuit for initiating action to avoid aircraft stall;
   means for energizing said response circuit when said difference exceeds a predetermined level; and
   said system including means for providing a series of high power very short laser pulses for said distant velocity measurements, means for providing a long lower power pulse for said near velocity measurements, and means for maintaining said laser at very low power levels between pulses for reference frequency purposes;
   whereby wind shear is detected at least several seconds prior to a drastic change in airspeed so that appropriate corrective action may be taken.

9. An airborne wind shear safety system for mounting on an aircraft comprising:
   a laser;
   means for mounting said laser on an aircraft, with the laser directed substantially forwardly from the aircraft;
   means for focusing said laser alternately at a near zone close to the aircraft, and at a distant zone spaced at least one-quarter mile ahead of the aircraft;
   means for receiving the reflected return from aerosols or other particles in the air and for beating them with reference signals derived from said laser to provide a radio frequency signal representative of the doppler shift in the reflected signals at both the near zone and at the distant zone;
   means for determining the relative speed of the air with respect to the aircraft both at the near and distant zones from said radio frequency signals;
   means for determining the difference in relative speeds at the near and distant zones;
   a response circuit for initiating action to avoid aircraft stall;

means for energizing said response circuit when said difference exceeds a predetermined level; and said speed determining means including an analog to digital converter, a fast fourier transform processor, and a microprocessor, for performing the velocity calculations;

whereby wind shear is detected at least several seconds prior to a drastic change in airspeed so that appropriate corrective action may be taken.

* * * * *